United States Patent Office 3,252,929
Patented May 24, 1966

3,252,929
HEAT AND LIGHT STABLE HALOGEN-CONTAINING RESINS STABILIZED BY TRIALKYL TIN PROPIOLATES
Ferdinand C. Meyer, St. Louis, Mo., assignor to Monsanto Company, a corporation of Delaware
No Drawing. Filed Dec. 28, 1961, Ser. No. 162,925
13 Claims. (Cl. 260—23)

This invention relates to the stabilization of halogen-containing resins against the deteriorating effects of heat and light.

Halogen-containing resin polymers are notoriously unstable upon exposure to heat and ultraviolet light. This instability is evidenced by the rapid discoloration and serious stiffening apparent after exposure to processing temperatures, and/or outdoor weathering. Moreover, this instability is sometime aggravated by the presence of plasticizers and other additives which are themselves prone to degradation. It is imperative then for the successful use of these halogen-containing resin compositions, that the formulation must contain additives capable of preventing this discoloration and loss of physical properties which occurs during processing and/or exposure to outdoor conditions, particularly ultraviolet light effects.

Accordingly, it is an object of this invention to provide novel halogen-containing resin compositions having improved heat and light stability properties. Another object of this invention is to provide a process for stabilizing halogen-containing resinous polymers against the adverse effects of heat and light. Other objects will become apparent from the following description of the invention.

According to this invention it has been found that the heat and light stability properties of halogen-containing resin polymer compositions are substantially improved by incorporating therein a trialkyltin propiolate compound having from 1 to 18 carbon atoms in each alkyl radical bonded to the tin atom of the compound, in heat and light stabilizing amounts.

The trialkyltin propiolate compounds which are used as heat and light stabilizers for halogen-containing resin compositions in accordance with this invention are the subject of a copending application S.N. 162,926, filed December 28, 1961, and as described therein may be prepared by reacting propiolic acid with a bis(trialkyltin) oxide. These trialkyltin propiolate compounds may be characterized as having a triple bond, and a trialkylstannic group bonded through an oxygen atom to the carboxyl group of the propiolic acid.

Examples of trialkyltin propiolates which may be used to effect heat and light stabilization of halogen-containing resin compositions in accordance with this invention are exemplified by the following: trimethyltin propiolate, triethyltin propiolate, tri-n-propyltin propiolate, triisopropyltin propiolate, tri-n-butyltin propiolate, triisobutyltin propiolate, tripentyltin propiolate, triheptyltin propiolate, tridecyl propiolate, tridodecyltin propiolate, tripentadecyltin propiolate, trioctadecyltin propiolate. Trialkyltin propiolate having mixed alkyl groups, that is, those having different alkyl groups bonded to the tin atom of the molecule may also be used within the scope of this invention. For example, there may be used dimethylethyltin propiolate or dibutyloctyltin propiolate. Mixtures of trialkyltin propiolates may also be used.

The bis(trialkyltin) oxides, used in preparing the trialkyltin propiolates, may be obtained by a variety of methods. They may be formed by a direct or indirect dehydration of trialkyltin hydroxides. They may also be prepared by the oxidation of trialkyltin hydrides with metal oxides. For example, bis(trimethyltin) oxide has been prepared by treating trimethyltin hydroxide with elemental sodium in benzene. Bis(triethyltin) oxide has been prepared by hydrolyzing triethyltin halides with aqueous alkali and dehydrating the resulting product at elevated temperatures; it has also been produced by distilling triethyltin hydroxide under reduced pressure, by reacting silver oxide with S-methyl triethyltin or bis(triethyltin) sulfide, and by reacting triethyltin hydride with metal oxides such as HgO, ZnO, $Fe_2O_3$, PbO, $As_4O_6$, $V_2O_5$ and $KMnO_4$. Bis(trihexyltin) oxide has been prepared by shaking trihexyltin bromide with aqueous sodium hydroxide in ether. Bis(trioctyltin) oxide has been prepared in a similar manner by brominating tetraoctyltin at —40° C., shaking the resulting trioctyltin bromide with aqueous 33% sodium hydroxide in ether, and drying the product after removal of the solvent at 100° C./12 mm. The higher bis(trialkyltin) oxide may be prepared by similar methods.

The propiolic acid used in the reaction with the bis(trialkyltin) oxides to produce trialkyltin propiolates is a well known, readily available material.

The trialkyltin propiolates are prepared by directly reacting propiolic acid with the bis(trialkyltin) oxide in the presence or absence of a solvent or diluent. If used, such solvent or diluent may be any non-reactive solvent or diluent such as the common aromatic solvents, e.g., benzene, toluene, etc., and the aliphatic solvents, e.g., hexane, cyclohexane, heptane, etc., as well as the aliphatic halides such as methylene chloride, methylene bromide, chloroform, carbon tetrachloride. The reaction generally may be conducted over a broad temperature range short of decomposition of the reactants and products, e.g. from about —40° C. to 150° C., although more preferred temperatures range from about 0° C. to 100° C. Atmospheric pressure is generally sufficient but reduced or elevated pressures may be used. Reaction times vary depending upon the bis(trialkyltin) oxide being used and the extent of reaction desired. Generally, for efficient use of reactants with reasonably good yields of product, the reactants are allowed to stand, or are shaken or stirred for time periods ranging from ½ to 10 hours, the shorter time periods generally being used with the more vigorous physical reaction conditions.

Separation of the trialkyltin propiolate products from the reaction media may be accomplished by known chemical and physical means. When the product is liquid, distillation or solvent extraction procedures are normally sufficient. Solid products may be separated by filtration, washings, recrystallization procedures, etc. Further purification by selective solvent extraction, distillation, or by absorptive agents such as activated carbon or clays can precede the removal of the inert liquid or solvent.

It has been found according to this invention that trialkyltin propiolates of the above defined type provide both heat and light stability characteristics to halogen-containing resin compositions but they are particularly useful as light stability additives since for such purposes they have been found to be far superior to other related types of compounds. They may be used as the only stabilizer for the halogen-containing resin but can be combined with other ingredients in the resin composition.

The following examples are illustrative of the invention but in no manner are to be construed as limitative thereof.

The compositions and examples set forth below are prepared by mixing the halogen-containing resin with the indicated plasticizer, epoxy compound, stabilizer compound and processing aid in the amounts set forth. In general, the several ingredients are mixed on differential speed rolls at a roll temperature of 160° C.–170° C. to form a homogeneous composition which is removed from the roll in the form of crude sheets. These crude sheets are about 0.040 inch in thickness employing a molding cycle of 1 minute at 160° C. The heat stability is determined by heating the molded sheet at 170° C. The light stability is determined after fadeometer exposure.

EXAMPLE I

| Formulation (Parts by Weight) | A | B | C |
|---|---|---|---|
| Polyvinyl chloride (PVC) | 100 | 100 | 100 |
| Di(2-ethylhexyl) phthalate | 50 | 50 | 47 |
| Epoxidized Soy Bean Oil (G-62) | | | 3 |
| Stabilizer | 1 | 3 | 2 |
| Stearic Acid (Processing Aid) | ½ | ½ | ½ |

Compositions of the above types were formulated and compounded as follows:

The PVC homoploymer, plasticizers, and stabilizer(s) were weighed into a tared 250 ml. beaker in the above indicated proportional amounts so that the combined weights of the ingredients of the composition totaled a maximum of 60 grams. The contents of the beaker was stirred until homogeneous mixture was obtained, and then removed from the beaker and placed into the rolls of a 3″ by 6″ roll mill machine. The formulations were mixed for 5 minutes in the rolls at 165° C. and then sheets of the milled composition were pressed out. Small rectangular portions of the sheeted compositions were cut out and attached to the Results Sheet for comparison with other portions which are removed from the sheet after designated numbers of time units of heat and light treatment.

For the heat stability test samples of milled formulation of the polymer composition containing the test compound as a heat stabilizer and another milled formulation containing no heat stabilizer were attached to a loop strip of cardboard or thin aluminum sheeting. The thus mounted samples were attached to brackets which were attached to rotary racks and put into an air circulating oven heated to 170° C. The oven air ducts were open at all times. The duration of the test was until failure. However, the mounted sample of each formulation was removed from the oven at the end of each 20 minutes and an indicative portion is cut from the sample and stapled (or otherwise attached) to a heat stability card (result sheet). In each test the test was discontinued if the formulation sample was turned dark brown or black before 200 minutes had passed. In reporting the results of degradation of the formulated composition, the time periods required to change the clear film color of the starting formulation through the following color changes were noted.

*Clear film*

Coloration degrees:
  Slight
  Light yellow
  Yellow
  Light amber
  Dark amber
  Brown
  Black Samples of the heat treated sheets were cut at specified time intervals as the color changed. The samples so taken were mounted on the heat stability card as above for color comparative purposes.

For the light stability test milled sheets of the polyvinyl chloride formulations, described above, were tested according to the uniform Method D-822-46T ASTM Standards on Plastics, March 1953, p. 810, in An Atlas Single Arc Weathering Apparatus (Fadeometer) as follows:

The samples of the test formulations of plasticized polyvinyl chloride were fastened to the test panels supplied with the weathering unit, and were, suspended from the units exposure racks in direct rays of the ultraviolet arc light. The arc light is provided by a combination of carbon arcs known commercially as No. 70 solid carbons and No. 20 cored carbons, the combination being such that one full-length carbon, either cored or solid is used with a pair of opposite type carbons, cut to a size length of 4 inches. The temperature within the Fadeometer was controlled by the circulation of sufficient air to produce a black panel temperature of 145°±5° F. The test panels in the Fadeometer made four complete revolutions about the arc light per minute and were exposed to the arc light for a period of at least 1000 hours' actual exposure or until that time when pronounced discoloration or degradation of the test sample warrants the termination of the test.

Below is a tabulation of the results obtained:

| Stabilizer | Formulation No. | Heat Stability Minutes to failure at 170° C. | Light Stability Hours to failure in fadeometer |
|---|---|---|---|
| Control (no stabilizer) | | 20 | 50 |
| Commercial stabilizer (dibutyltin dilaurate) | A | 80 | 600 |
| | B | 120 | 1,400 |
| | C | 140 | 1,400 |
| Tributyltin propiolate | A | 80 | 800 |
| | B | 100 | 2,700 |
| | C | 140 | 2,300 |

The test results indicate that compositions compared using tributyltin propiolate as a stabilizer exhibited substantially the same heat stability characteristics as compositions prepared using dibutyltin dilaurate. Compositions containing tributyltin propiolate as stabilizer are superior to compositions containing dibutyltin dilaurate in light stability characteristics.

Compositions having similarly improved light and heat stability properties are prepared by replacing the epoxy compound of compositions containing trialkyltin propiolate, that is, the epoxidized soybean oil, with substantially the same amount, respectively, of butyl glycidyl phthalate, cyclohexyl-9,10-epoxyoctadecanoate, methyl-9,10-epoxyoctadeconate, glycidyllaurate, 2-ethylhexyl glycidyl adipate, 1,2-epoxytetradecane and 1,2-epoxy-3-(2-naphthoxy)propane.

As further illustrative of this invention are the following:

EXAMPLE II

A plasticized composition containing 100 parts polyvinyl chloride and 35 parts tricresyl phosphate is stabilized by incorporating therein a mixture of 10 parts of trioctyltin propiolate, 3 parts of calcium ethylacetoacetate and 5 parts of cyclohexyl-9,10-epoxyoctadecanoate. The resulting composition possesses improved heat and light stability characteristics as compared with a plasticized composition containing 100 parts of polyvinyl chloride, 45 parts of tricresyl phosphate, and 5 parts of calcium ethylacetoacetate.

EXAMPLE III

A mixture of 100 parts of a copolymer of 90 parts vinyl chloride and 10 parts diethyl maleate, 50 parts of 2-ethylhexyl dicresyl phosphate, 10 parts of tridodecyltin propiolate, and 3 parts of epoxidized linseed oil is processed into homogeneous molded sheets in the usual manner with the aid of ½ part of stearic acid to prevent sticking. The resulting composition possesses improved heat and light stability characteristics as compared to a plasticized composition containing 100 parts of a copolymer of 90 parts vinyl chloride and 10 parts diethyl maleate, 50 parts of 2-ethyl dicresyl phosphate and 4 parts of epoxidized linseed oil.

EXAMPLE IV

A plasticized composition containing 100 parts of a copolymer of 90 parts of vinyl chloride and 10 parts vinyl acetate, 40 parts of dioctyl phthalate is stabilized by incorporating therein a mixture of 3 parts of tripentadecyltin propiolate, and 6 parts of methyl 9,10-epoxyoctadecanoate. The resulting composition possesses improved heat and light characteristics as compared with a plasticized composition containing 100 parts of a copolymer of 90 parts vinyl chloride and 10 parts vinyl acetate, 50 parts of dioctyl phthalate, and 9 parts of methyl 9,10-epoxyoctadecanoate.

For most purposes 0.1 to 10 parts by weight of the trialkyltin propiolate component per 100 parts by weight of the halogen-containing resin component will provide satisfactory results. Preferred ranges are from 0.5 to 5 parts by weight of the trialkyltin propiolate to 100 parts by weight of the resin component.

On substituting for the polyvinyl chloride used in the foregoing examples, other halogen-containing resins, it is found that suprisingly effective light stabilization results are obtained with such other resins, numerous examples of which are well known to those skilled in the art. Thus, for the polyvinyl chloride there may be substituted resins made from such vinylidene compounds such as vinylidene chloride, vinyl chloracetate, chloro styrenes, chloro butadienes, etc. Such vinyl compounds may be polymerized singly or in a mixture with these or other halogen-containing vinylidene compounds or with vinylidene compounds free from halogen. Among the unsaturated materials free from halogen which may be copolymerized with halogen-containing vinylidene compounds are vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, para-ethyl styrene, divinyl benzene, vinyl naphthalene, alpha-methyl styrene; dienes, such as butadiene, unsaturated amides, such as acrylic acid amide, acrylic acid aniline, unsaturated nitriles, such as acrylic acid nitrile, esters of α,β-unsaturated carboxylic acids, for example, the methyl, ethyl, propyl, butyl, amyl, hexyl, heptyl, octyl, allyl, methallyl, and the phenyl esters of maleic, crotonic, itaconic, fumraic acids and the like. The class of copolymers in which a predominant portion, i.e., more than 50% by weight, of the copolymer is made from a halogen-containing vinylidene compound such as vinyl chloride represents a preferred class of polymers to be treated according to the invention.

Among the preferred embodiments of the invention is the stabilization of polymers prepared by the copolymerization of 95 to 80 parts by weight of a vinyl halide, e.g. vinyl chloride with 5 to 20 parts by weight of an α,β-unsaturated polycarboxylic acid ester such as diethyl maleate or other esters of maleic, fumaric, aconitic, itaconic acids, etc. Among the preferred esters of such acids are alkyl esters in which the alkyl group contains not over 8 carbons atoms.

The trialkyltin propiolate light and heat stabilizers of this invention are also effective when intimately mixed with halogen-containing resins in which part or all of the halogen is introduced into a preformed resin, e.g. chlorinated polyvinyl acetate, chlorinated polystyrene, chlorinated polyvinyl chloride, chlorinated natural and synthetic rubbers, rubber hydrochloride, etc.

The trialkyltin propiolate light and heat stabilizers of the invention are also effective in halogen-containing resins containing halogens other than chloride, e.g., bromine, fluorine nad iodine.

The halogen-containing resins may contain a varying proportion of halogen depending upon the nature of the resin and its contemplated use. However, as indicated above, vinyl chloride polymers in which the proportion of vinyl chloride units amount to 50% or more of the total monomer used in making the polymeric product represents a preferred class of polymers to be heat and light stabilized according to the invention.

Ordinarily at least 1 part of the epoxy compound is used in stabilizing 100 parts of a halogen-containing resin for most uses and generally, at least 5 parts of the epoxy compounds are preferred, although smaller amounts are effective to a considerable degree. Much larger amounts may be used, e.g. 50–100 parts, and serve to lengthen the useful life of the halogen-containing resins although not in direct proportion to the amount used. However, in some cases the epoxy compound may serve both as a plasticizer and an element of the stabilizer mixture and in such cases it may be worthwhile to incorporate such larger amounts.

The epoxy compounds used in conjunction with the light stabilizer mixture of this invention comprise organic compounds generally containing one or more

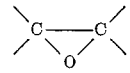

groups. Various substituted and unsubstituted aliphatic, aromatic, alicyclic and heterocyclic groups may be attached to said epoxy group. Generally, however, the epoxy compounds which are employed should have a boiling point at atmospheric pressure of at least 150° C.; otherwise the stabilizing effect is likely to be relatively transitory due to evaporation of the epoxy compound and preferably the epoxy compounds should have a boiling point of at least 200° C. at atmospheric pressure. Illustrative examples of epoxy compounds which may be used according to the invention are 1,2-epoxy-tetradecane, 1,2-epoxyoctadecane and other derivatives of long chain alkanes, for example, alkanes having 10–24 carbon atoms having a

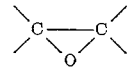

group; epoxy esters containing a long carbon chain such as glycidyl laurate, methyl 9,10-epoxyoctadecanoate, diethylene glycol, di9,10-epoxyoctadecanoate, 9,10-epoxy-octadecanyl acetate, 9,10-epoxyoctadecanyl octadecanoate, esters of polycarboxylic acids and alcohols containing a

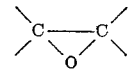

group such as di-2-ethylhexyl epoxy succinate, butyl glycidyl phthalate, diglycidyl phthalate, propylene glycol diglycidyl phthalate, diethylene glycol diglycidyl maleate, 2-ethylhexyl glycidyl adipate, hexyl glycidyl sebacate and other esters of these and other polycarboxylic acids containing at least a

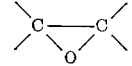

group and epoxidized acids and esters generally containing an unsaturated long chain aliphatic group such as epoxidized animal, vegetable or marine oils or the fatty acids or mixtures of fatty acids contained in such oils and esters thereof, e.g., epoxidized linseed oil, epoxidized soybean oil, epoxidized oleic acid, epoxidized tung oil, the methyl ester of epoxidized linseed oil fatty acids, etc. glycidols such as glycidol, beta-methyl glycidol, beta-ethyl glycidol, beta-hydroxy methyl glycidol, di-isobutenyl dioxide; epoxidized ethers such as alkyl glycidol ethers in which the alkyl group contains 1–5 carbon atoms, e.g. methyl, ethyl, propyl, butyl, amyl glycidyl ethers; glycidyl ethers containing unsaturated groups such as vinyl, allyl and methylallyl glycidyl ethers, phenyl glycidyl ether, tolyl glycidyl ethers, naphthyl glycidyl ethers, cyclopentyl glycidyl ether, cyclohexyl glycidyl ether, etc. Other illustrative epoxy compounds include cyclohexane oxide, 1-(2-phenylphenoxy) propylene oxide-2,3, 1-(2-phenylcyclohexanoxy) propylene oxide-2,3, 1-(cyclohexanoxy) propylene oxide-2,3, 1-(2-cyclohexylphenoxy) propylene oxide-2,3, 1-(4-tertiary butyl phenoxy) propylene oxide-2,3, styrene oxides such as styrene oxide, p-ethylstyrene oxide, dimethyl styrene oxide, ortho-methoxy styrene oxide, 4-(2,3-epoxy-propoxy) acetyl phenone, the corresponding benzophenone epoxide, 4,4'-di(2,3-epoxy-propoxy) benzophenone, mesityl oxide epoxide; epoxy alkyl and epoxy cycloalkyl amides such as 2-ethyl-3-propyl glycidamide, 2,3-di-propylglycidamide; aryloxyalkene oxides such as phenoxy propene oxide, p-tert-amyl and p-secondary amyl phenoxy propene oxides.

According to one embodiment of the invention the epoxy compounds are epoxy ethers such as the glycidyl ethers of such polyhydric alcohols as glycerin, diglycerol, erythritol, pentaglycerol, pentaerythritol, mannitol, sorbitol, polyallyl alcohol, polyvinyl alcohol, ethylene glycol, propylene glycol, butylene glycol, etc.

One of the preferred classes of epoxy compounds comprises high molecular weight or resinous epoxy compounds, for example, those made by reacting polyhydric phenols with epichlorohydrin in various ratios in alkaline solution. Among the polyhydric phenols which may be used in preparing such glycidyl ethers are mononuclear phenols like resorcinol, catechol, hydroquinone, etc., or polynuclear phenols like bis(4-hydroxyphenyl) 2,2-propane (bisphenol), 4,4'-dihydroxy benzophenone, bis(4-hydroxyphenyl) - 1,1-ethane, bis(4-hydroxyphenyl)-1,1-isobutane, bis(4-hydroxyphenyl) - 2,2 - butane, bis(4-hydroxy-2-methylphenyl) - 2,2 - propane, bis(4-hydroxy-2-tertiary butyl phenyl)-2,2-propane, bis(2-dihydroxynaphthyl)-methane, 1,5-dihydroxy naphthalene, 1,4-dihydroxy naphthalene, 9,10-dihydroxy anthracene, 1,3,6-trihydroxy naphthalene, 4,4-dihydroxy diphenyl, 2,2-bis(4-hydroxyphenyl)-propane and 1,4 - bis(4-hydroxyphenyl)-cyclohexane, etc. Such phenols may be reacted with epoxy chlorohydrin in the presence of an inorganic alkaline material to form the epoxy compounds, which, depending upon the conditions of the reaction, may be either monomeric or polymeric materials. Examples of such epoxy compounds include 1,4-diglycidol epoxy benzenes and 2,2-bis(4-glycidol oxyphenyl)-propanes.

Other compounds containing a

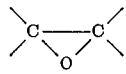

group which may be used in accordance with the invention include those made by reacting alkyl sulfonyl chlorides with glycidol in the presence of ammonia wherein the alkyl group contains up to 20 or more carbon atoms, e.g.

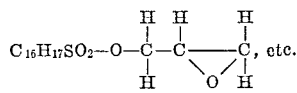

Mixtures of unsaturated aliphatic acids may be employed, as for example, mixtures of acids occurring in various oils, as for example, linseed, castor, tung, soya bean, perilla corn, cotton seed, sunflower, safflower, sesame, poppy seed, walnut, peanut, olive, rape seed, whale and dehydrated castor oils. The acids derived from these oils consist predominantly of unsaturated acids containing 18 carbon atoms. For certain purposes, salts may be used which are made of the mixtures of acids occurring in oils such as palm kernel oil, cocoanut oil and the like, which mixtures of acids contain substantial amounts of unsaturated acids such as those mentioned above, but do not predominate therein.

Similar heat and light stabilization results are obtained when the di(2-ethylhexyl) phthalate plasticizers in compositions A, B and C is completely or partly replaced with substantially the same amount of other phthalate plasticizer such as dioctyl phthalate, butyl benzyl phthalate, diisodecyl phthalate, etc.

Phosphorus-containing plasticizers such as tricresyl phosphate, triphenyl phosphite, etc. may also be used in these halogen-containing resin compositions. The amount of the phosphorus containing esters which may be used may be substantially varied depending upon the particular ester and upon the particular use which is contemplated for the plasticized composition. Usually, however, from 10 to 100 parts of the esters are used for every 100 parts of the halogen-containing resin. In the case of certain halogen-containing resins no plasticizers are required.

While the invention has been described with respect to certain embodiments it is to be understood that it is not so limited, that variations and modifications thereof obvious to those skilled in the art may be made without departing from the spirit or scope of the invention.

I claim:
1. A composition resistant to the deteriorating effects of heat and light comprising a chlorine-containing resin polymer derived from an unsaturated monomer and as a stabilizer therefor a trialkyltin propiolate having from 1 to 18 carbon atoms in each alkyl group bonded to the tin atom of the molecule in heat and light stabilizing amounts of from 0.1 to 10 parts by weight per 100 parts by weight of the chlorine-containing resin polymer.

2. A composition resistant to the deteriorating effects of heat and light comprising a chlorine containing vinylidene polymer in which at least 50% of the monomer units are vinylidene units, any balance being units of an ethylenically unsaturated monomer, and as a stabilizer therefor a trialkyltin propiolate having from 1 to 18 carbon atoms in each alkyl group bonded to the tin atom of the molecule in amounts in the range of 0.5 to 10 parts by weight per 100 parts by weight of the chlorine containing vinylidene polymer.

3. A composition resistant to the deteriorating effects of heat and light comprising a chlorine containing vinylidene polymer in which at least 50% of the monomer units are vinylidene units, any balance being units of an ethylenically unsaturated monomer plasticized with from 10 to 100 parts of a member of the group consisting of a phthalate ester and a phosphate ester per 100 parts of the chlorine-containing vinylidene polymer, and as a stabilizer therefor a trialkyltin propiolate having from 1 to 18 carbon atoms in each alkyl group bonded to the tin atom of the molecule, said stabilizer being present in the range of from 0.1 to 10 parts by weight per 100 parts by weight of the chlorine-containing vinylidene polymer, and an epoxy compound characterized by the grouping

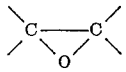

having a boiling point at atmospheric pressure of at least 150° C., in an amount of from 1 to 100 parts of epoxy compound to 100 parts of the chlorine-containing vinylidene polymer.

4. A composition resistant in the deteriorating effects of heat and light comprising vinyl chloride polymer in which at least 50% of the monomer units are vinyl chloride units, any balance being units of an ethylenically unsaturated monomer, plasticized with from 10 to 100 parts of a phthalate ester per 100 parts of vinyl chloride polymer, and as a stabilizer therefor a trialkyltin propiolate having from 1 to 18 carbon atoms in each alkyl group bonded to the tin atom of the molecule in heat and light stabilizing amounts in the range of 0.5 to 10 parts by weight per 100 parts by weight of the vinyl chloride polymer and an epoxy compound characterized by the grouping

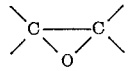

having a boiling point of at least 200° C. at atmospheric pressure in an amount of from 5 to 100 parts of the epoxy compound to 100 parts of the vinyl chloride polymer.

5. A composition according to claim 3 wherein the chlorine containing vinylidene polymer is polyvinyl chloride.

6. A composition according to claim 3 wherein the chlorine containing vinylidene polymer is a vinyl chloride-vinyl acetate copolymer.

7. A composition according to claim 3 wherein the plasticizer therefor is a phthalate ester plasticizer.

8. A composition according to claim 7 wherein the phthalate ester is di(2-ethylhexyl) phthalate 9. A composition according to claim 1 wherein the trialkyltin propiolate is tributyltin propiolate.

10. A composition resistant to the deteriorating effects of heat and light comprising vinyl chloride polymer in which at least 50% of the monomer units are vinyl chloride units, any balance being units of an ethylenically unsaturated monomer, plasticized with di(2-ethylhexyl) phthalate, 0.5 to 5 parts by weight of tributyltin propiolate and 5 to 100 parts by weight of epoxy compound characterized by the grouping

the said parts by weight being based upon 100 parts by weight of said vinyl chloride polymer.

11. A composition as described in claim 2, wherein the trialkyltin propiolate is tributyltin propiolate.

12. A composition as described in claim 3, wherein the trialkyltin propiolate is tributyltin propiolate.

13. A composition as described in claim 4 wherein the trialkyltin propiolate is tributyltin propiolate.

References Cited by the Examiner

UNITED STATES PATENTS 2,700,675   1/1955   Mack _____ 260—45.75 X

DONALD E. CZAJA, *Primary Examiner.*

A. D. SULLIVAN, L. J. BERCOVITZ, *Examiners.*